United States Patent
Hedin et al.

(10) Patent No.: US 7,966,404 B2
(45) Date of Patent: Jun. 21, 2011

(54) PROXY APPARATUS AND METHOD (75) Inventors: Jan Hedin, Tumba (SE); Frank Hundscheidt, Kerkrade (NL); George Vergopoulos, Athens (GR); Jerker Widmark, Sundbyberg (SE); Stefan Leupers, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1260 days.

(21) Appl. No.: 10/312,080

(22) PCT Filed: Apr. 19, 2001

(86) PCT No.: PCT/EP01/04452
§ 371 (c)(1),
(2), (4) Date: Nov. 7, 2003

(87) PCT Pub. No.: WO01/82559
PCT Pub. Date: Nov. 1, 2001

(65) Prior Publication Data
US 2004/0073685 A1    Apr. 15, 2004

(30) Foreign Application Priority Data
Apr. 20, 2000  (EP) .................................... 00108043

(51) Int. Cl.
*G06F 15/16* (2006.01)
(52) U.S. Cl. .......................... 709/227; 709/204; 709/231
(58) Field of Classification Search .................... 709/227
See application file for complete search history.

(56) References Cited

U.S. PATENT DOCUMENTS

| | | | | |
|---|---|---|---|---|
| 3,573,377 | A * | 4/1971 | Anderson et al. | 348/14.11 |
| 5,138,614 | A * | 8/1992 | Baumgartner et al. | 370/261 |
| 5,625,678 | A * | 4/1997 | Blomfield-Brown | 379/93.08 |
| 6,020,915 | A * | 2/2000 | Bruno et al. | 348/14.09 |
| 6,104,716 | A * | 8/2000 | Crichton et al. | 370/401 |
| 6,161,137 | A * | 12/2000 | Ogdon et al. | 709/224 |
| 6,253,249 | B1 * | 6/2001 | Belzile | 709/249 |
| 6,603,774 | B1 * | 8/2003 | Knappe et al. | 370/466 |
| 6,876,734 | B1 * | 4/2005 | Summers et al. | 379/202.01 |
| 7,043,749 | B1 * | 5/2006 | Davies | 725/120 |

FOREIGN PATENT DOCUMENTS

WO    WO 9944363 A1 *  9/1999

* cited by examiner

*Primary Examiner* — Andrew Caldwell
*Assistant Examiner* — Christopher D Biagini (57) ABSTRACT

A system, comprising various methods and apparatus providing a transparent communication session setup and control for communication sessions involving different communication capabilities, is disclosed. The system receives a request for a communication session at a proxy apparatus, the request being originated from a first subscriber to the communication session using a first group of terminals. The system identifies at least a second subscriber to the communication session using a second group of terminals. The system evaluates types of communication being available for the first group of terminals and at least the second group of terminals on the basis of the request. The system sets up terminal sub-sessions from the proxy apparatus to the first group of terminals and to at least the second group of terminals according to types of communication being available for the first group of terminals and at least the second group of terminals.

25 Claims, 10 Drawing Sheets

PROXY APPARATUS AND METHOD

PRIORITY CLAIM

This patent application claims priority to patent application serial No. PCT/EP01/04452 filed on Apr. 19, 2001.

FIELD OF INVENTION

The present invention relates to a proxy apparatus and method, in particular to a proxy apparatus and method for simultaneous voice, video and data applications to users using different terminals.

BACKGROUND OF INVENTION

Telephony and Internet based environments today drive introduction of IP/IT based services opening virtually unlimited opportunities, e.g., for multimedia communication services with content access, application sharing and whiteboarding type of applications. Here, the difference between existing telecom services will be significant and attractive for efficient communication.

Already today, different terminals with different capabilities, e.g., voice, video, data, multimedia, etc. are available in the market place. These different terminals are operated in different communication networks, e.g., POTS, ISDN, GSM using network services like HSCSD and GPRS and also different communication protocols, e.g., for multimedia the ITU-T H.323 and the IETF Session Initiated Protocol SIP exist.

However, an increasing number of available services, e.g., voice, data, multimedia will be provided through a plurality of different terminals being used for the different communication processes. The more terminals an end user will use the higher the effort to handle these different terminals will be. In an extreme case it could be possible that one end user has to handle a plurality of different end terminals, e.g., a mobile telephone for a voice call and a video terminal for video reception during a single communication session. This situation becomes even more severe in the case two persons communicating with each other use different groups of end terminals. Currently no solution is available to facilitate the handling and interfacing between different communication capabilities on both sides of a communication link.

These conventional application scenarios are very inconvenient for subscribers since in a communication session separate call setup is requested for each type of communication. Subscribers using different terminals have to initiate a voice communication link at the beginning of the communication session and to set up data and/or video links as far as necessary afterwards. However, what is missing is support for the coordination of the different setup procedures and for the control of the communication session. Also, a subscriber initiating a communication session does not have any knowledge on what type of terminals the other subscriber will use. Therefore it is impossible to achieve an efficient communication session setup and to address multiple terminals using only a single identifier. In other words, all the burden is put on the subscribers.

Further, the option to bring new types of applications to GSM, GPRS, UMTS or Internet users implies the need to introduce a common control for the different media streams as well as for conversion between, e.g., speech, data and video in a single circuit or packet switched bearer. Still further, no approach to overcome problems like long delays over radio, narrow bandwidth, long network delays, IP protocol overhead, lack of an efficient mechanism to prioritise real-time traffic over best effort traffic, etc. exist so far.

SUMMARY OF INVENTION

In view of the above, the object of the invention is to provide a method and apparatus that allows for a transparent communication session setup and control for communication sessions involving different communication capabilities.

According to the present invention this object is achieved through a proxy method that: receives a request for a communication session at a proxy apparatus, the request being originated from a first subscriber to the communication session using a first group of terminals and identifying at least a second subscriber to the communication session using a second group of terminals; evaluates types of communication being available for the first group of terminals and at least the second group of terminals on the basis of the request; and sets up terminal sub-sessions from the proxy apparatus to the first group of terminals and to at least the second group of terminals according to types of communication being available for the first group of terminals and at least the second group of terminals.

Therefore, the present invention relates to a new way to offer communication services to subscribers using different terminal groups. Typically, the proxy method according to the present invention is adapted to receive different media streams, e.g., speech, video, and data coming from a first subscriber using a first group of terminals and to map the incoming media streams onto outgoing media streams suited to at least a second terminal group of at least a second subscriber. Clearly, this concept is independent of either the type of bearer layers used or the specific communication capabilities of the terminal groups of the subscribers. Further, according to the present invention it is proposed to achieve the necessary information exchange to the subscribers of a communication session using different sub-communication processes equally referred to as communication sub-sessions or terminal sub-sessions in short. Each terminal sub-session is related to a particular communication capability such as data, voice, video, etc. being support by related terminals. Setting up terminal sub-sessions to subscribers according to the types of communication being common or available to both allows to link the applications of the subscribers using different terminal groups. One such example would be the mapping of a multimedia type application to a plurality of end terminals such as mobile telephones and terminals having data exchange capabilities. Another advantage of the present invention is that the number of subscribers to a communication session is not restricted. Therefore, a communication session may be, e.g., initiated between a first and second subscriber. Then a third and further subscribers may join a pre-installed communication session to achieve a conferencing type functionality.

According to a preferred embodiment of the invention the request for the communication session identifies the desired types of communication. An advantage is that types of communication must not be determined by the proxy method itself.

According to another preferred embodiment of the present invention types of communication are determined through reading of subscriber profiles and related communication types of subscribers from a subscriber profile data base. This approach is very well suited for application scenarios where subscribers repeatedly participate in communication sessions so that it is known in advance which type of terminal groups will be involved. Due to the availability of pre-stored user profile data the setup of terminal sub-sessions is accelerated.

According to another preferred embodiment of the present invention one subscriber is requested to input the communication capabilities of her/his terminal group. This approach is advantageous in case a subscriber to a communication session wants to influence the scope of services on his own. One typical scenario would be that e.g., for cost reasons—a subscriber only wants to use a certain communication capability type of terminal like voice and avoid, e.g., video communication that would eventually lead to higher charges.

According to another embodiment of the present invention terminal groups of subscribers are interrogated to determine related communication capabilities and/or readiness for service. Therefore, if a subscriber is not available at the time being for a certain application service a provision of this application may still be delayed until the subscriber hooks onto the communication net later on. Also, with this approach the selection of services is determined by availability of terminals of each subscriber.

According to another preferred embodiment of the present invention communication capabilities are negotiated via a dedicated protocol. This feature allows to scale for bandwidth and communication costs and communication performance either from the subscriber side or from the network operator side. Also, it is possible to flexibly adapt to a changing load situation in the communication network.

According to another embodiment of the present invention a transmission of payload and/or control information between subscribers is controlled by the proxy apparatus according to the type of communication of the respective terminal groups. Here, the question where the actual transmission and/or protocol conversion of different communication data is implemented is not a prerequisite for the inventive proxy method and apparatus. In other words, the proxy method and apparatus only involves the control of transmission of payload and/or control information. The actual transmission may be performed in other network nodes, e.g., voice gateways, access servers, etc. that may already be available. Therefore, the present invention makes use of already existing infrastructure.

According to another embodiment of the present invention the merging of payload information and/or control information is controlled. Such a merging may either be achieved by multiplexing or merging into a multimedia stream, e.g., according to the H.323 standard or alternatively through synchronized transmission. Thus, exchange functionality between a terminal having increased capabilities and, e.g., a plurality of lower functionality end terminals may be achieved.

According to another preferred embodiment of the present invention payload information and/or control information may be splitted. This aspect allows to extend the previously described merging aspect into a fully bidirectional exchange of information.

According to another preferred embodiment of the present invention a conversion of different formats may be executed and/or controlled. This conversion may either be related to payload information and/or control information. Again, the present invention does not require the implementation of the conversion itself but only requires the control of such a conversion which may be realised using already installed conversion equipment. E.g., the aspect of conversion is of importance in case the present invention is applied to a plurality of bearer layers and/or communication standards and/or communication protocols.

According to a preferred embodiment of the present invention the types of communication may be re-evaluated. This reevaluation may either be carried out on request of a subscriber—e.g., if a subscriber wants to switch from video to pure voice communication—or in the case further subscribers join into or drop out of a communication session. The re-evaluation considers the fact that the modification of a communication session may require a new optimisation of related parameters. One such example would be that if a subscriber using only low bandwidth terminals drops out, the remaining subscribers of a communication session may then scale up the used bandwidth or even add further communication capabilities like data and/or video in addition to the previously used voice only. Generally, the re-evaluation allows for a time variant optimised control of an ongoing communication session.

According to a preferred embodiment of the present invention there is provided the opportunity to handle a request to join a communication session. This request triggers the determination of the related ongoing communication session. Then, it is determined whether the applying subscriber will be admitted to the communication session or whether the request is to be rejected. In the case that the new subscriber is admitted new terminal sub-sessions are established and optionally again the parameters for the ongoing communication session may optimised. The mapping of the incoming request to an ongoing communication session may typically be performed using the target address or an ID for the communication session which is given in the request. This aspect of the invention supports the implementation of conference type communication sessions, however, without the request for each subscriber to have pre-defined terminal equipment that may incur high costs. To the contrary, conferencing type communication sessions may be set up using any type of terminal group in a very cost-efficient way.

According to a preferred embodiment of the present invention there is provided the opportunity to release a communication session. Therefore, either a subscriber may switch off one of his terminals or completely drop out of a communication session while the communication session still goes on. Also this aspect of the present invention supports the flexible time-variant configuration of the communication session, whatever the demand of the subscribers will be.

According to another preferred embodiment of the present invention there is provided the opportunity for inter-proxy communication. This approach is advantageous in case subscribers are assigned to different network domains or, in other words, are subscribed to different networks. Here, one subscriber can be linked to a mobile cellular communication network of the GSM type and the other to a cellular mobile communication network of the UMTS type, to a PSTN network or to an IP-based LAN network. Here, the inventive proxy method and apparatus is adapted for inter-proxy communication, which makes it possible to use a common inter-proxy communication protocol to become independent of network-specific communication protocols or bearer capabilities.

Further, the objects outlined above are achieved by a proxy apparatus having: a setup control unit receiving a request for a communication session, the request being originated from a first subscriber using a first group of terminals and identifying at least a second subscriber to the communication session using a second group of terminals; an evaluation unit evaluating types of communication being available for the first group of terminals and at least the second group of terminals on the basis of the request; and a session control unit setting up terminal sub-sessions from the proxy apparatus to the first group of terminals and to at least the second group of terminals according to types of communication being commonly available for the first group of terminals and is at least the second group of terminals.

The proxy apparatus according to the present invention achieves the same advantages as outlined above with respect to the present invention's proxy method.

Further, a very important aspect of the inventive proxy apparatus is that it may easily be attached to an existing network without any additional impacts on the network itself or the end terminals used therein.

Further, it may be used with a broad range of different, preferably wireless but also fixed, access technologies, e.g., GSM, GPRS, EDGE, UMTS, and provide a means for decoupling the one-to-one relationship between user end terminals and application types.

Further, the inventive proxy apparatus enables the efficient transfer of multimedia type applications to roaming users of mobile cellular communication networks. Here, the end user gets a high quality perception of the application since for each media stream, e.g., audio, video, data, etc. the proxy controller selects the native bearer for optimum transmission. Nevertheless, the inventive proxy apparatus is not only related to mobile communication standards but may as well co-operate with other multimedia standards, e.g., H.323 or SIP.

Further, the inventive proxy apparatus hides the network specifics and enables a service provider and/or network operator to offer applications initiated in a remote network of any type, e.g., a fixed network or a LAN or Internet, to roaming, mobile subscribers thus increasing service provider revenues.

According to another preferred embodiment of the present invention there is also provided a computer program product directly loadable into the internal memory of the proxy apparatus comprising software code portions for performing the inventive proxy method when the product is run on a processor of the proxy apparatus.

Therefore, the present invention also achieves an implementation of the inventive method steps on computer or processor systems. In conclusion, such implementation leads to the provision of computer program products for use with a 30-computer system or more, specifically a processor comprised in, e.g., the proxy apparatus.

The computer program defining the functions of the present invention can be delivered to a computer/processor in many forms, including, but not limited to information permanently stored on non-writable storage media, e.g., read only memory devices such as ROM or CD ROM discs readable by processors or computer I/O attachments; information stored on writable storage media, i.e. floppy discs and harddrives; or information convey to a computer/processor through communication media such as network and/or telephone networks via modems or other interface devices. It should be understood that such media when carrying processor readable instructions implementing the inventive concept represent alternate embodiments of the present invention.

BRIEF DESCRIPTION OF THE DRAWINGS

In the following, preferred embodiments of the present invention will be described with reference to the drawings in which.

DETAILED DESCRIPTION

Throughout the description of the present invention that follows, reference will be made to the following definitions:

Addressing: In the simplest case provision of a receiver telephone number, ID or IP address. Alternatively, use of a prefix or any specific call number to identify a proxy-related communication request.

Communication session: A logical end-to-end connection between two or more subscriber terminal groups using one or more transmission/bearer layers and/or transmission protocols. A communication session may be supported by one or more communication systems and divides into at least two or more sub-sessions.

Gateway: A gateway converts payload information and/or control information between different data formats, protocols and/or codecs.

Gatekeeper: A gatekeeper handles admission requests, bandwidth allocation, etc. and forwards messages to the proxy. Also, the gatekeeper handles address translation, e.g., between E164 addresses and IP addresses.

Multimedia transmission: Transmission of multiple medias using the same transmission link, technique and/or protocol.

Network access server: Provides a wireless access to a core network, preferably an IP network.

Protocols: Packet switching protocols, circuit switching protocols, H.324M (UMTS), H.323, T.120, H.320 (ISDN), etc.

Proxy apparatus/method: Controls communication session, i.e. subsession(s) set-up, and protocol conversions, performs optionally also conversion as such.

Subscriber: Person that wants to communicate such that the communication is based on one or a plurality of terminals. Two or more subscribers participate in a communication session.

Synchronization: Coordination of different terminal sub-sessions that belong to a single communication session. In addition and more advanced, synchronization—for different terminal sub-sessions may be executed by investigating time stamps being transmitted from the corresponding sender, time signals defining a reference time or synchronization signals.

Terminal: Telecommunication apparatus for transmission and/or reception having the capability to support one or a plurality of terminal subsessions of a communication session. Terminals communicate either explicitly or implicitly with a proxy apparatus.

Terminal sub-session: Explicit or implicit communication link between a terminal and a proxy apparatus or any network device, e.g., a gateway. A terminal sub-session uses a dedicated protocol and a dedicated transmission mechanism to and/or from the proxy apparatus or the network device.

Transmission mechanism: ISDN, GSM, GPRS, Ethernet, Satellite, UMTS, WLAN, IP, HSCSD (high-speed circuit switched data), LAN, PDC, DAMPS, AMPS, POTS, etc.

Type of communication: Any form of information transmission, e.g., speech, audio, video, data or joined multimedia.

Voice gateway: Specific gateway converting speech, e.g., IP-based signalling and real-time protocol RTP payload into GSM signalling and speech codecs, e.g., PCM needed by the mobile switching center MSC.

Figure 1:
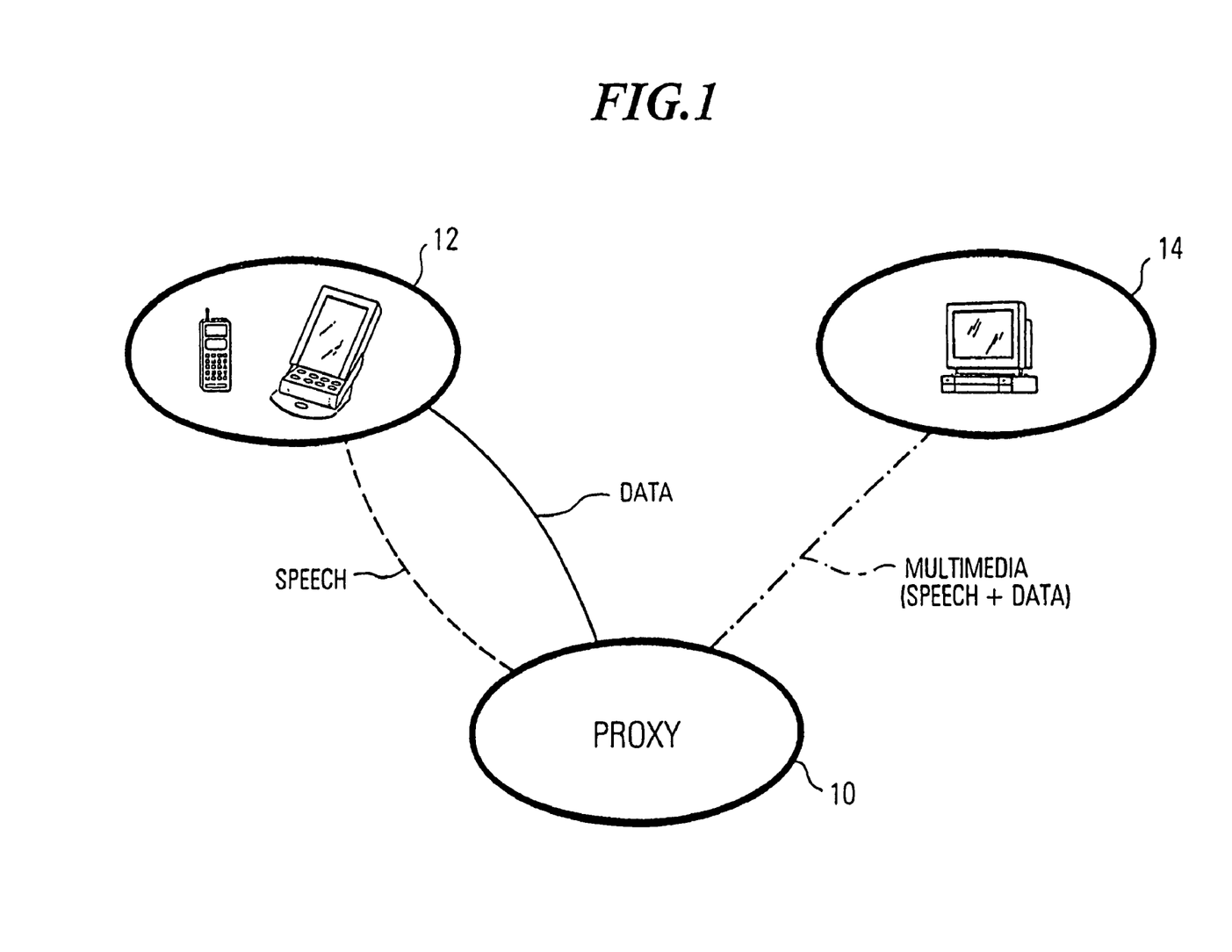
FIG. 1 shows the provision of a proxy apparatus according to the present invention between two subscribers with terminals using different bearer/communication protocols.
Figure 2:
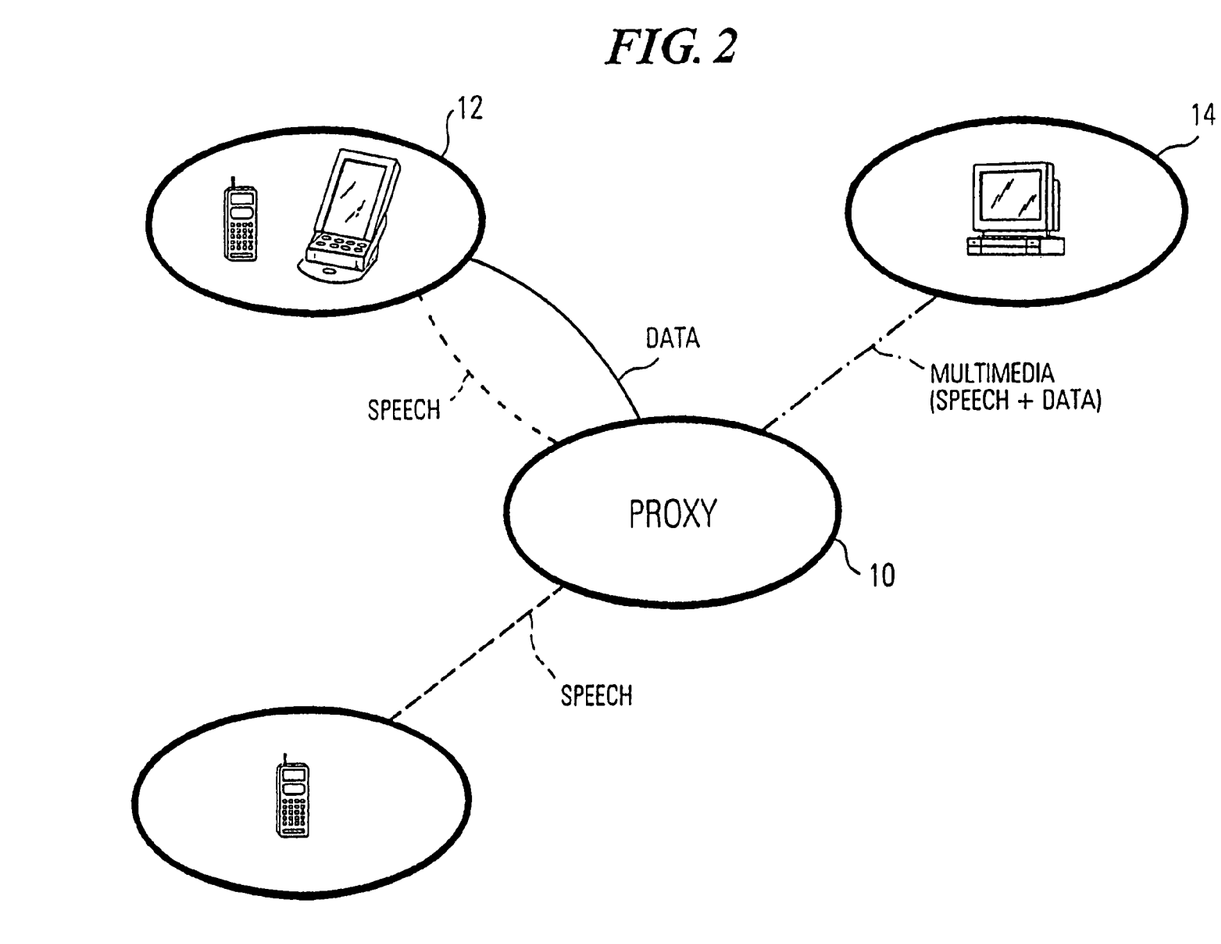
FIG. 2 shows the provision of the proxy apparatus according to the present invention between three subscribers with terminals using different bearer/communication protocols.

The present invention is now described in reference to FIGS. 1 and 2. FIG. 1 shows the provision of a proxy apparatus 10 between two subscribers 12, 14. The proxy apparatus receives a request for a communication session that originates from the first subscriber 12 using a first group of terminals—e.g., mobile telephone and data terminal. The request is sent from one terminal of the first group of terminals, The request identifies the second subscriber 14 using a second group of terminals—e.g., a multimedia PC. Preferably, the request comprises a prefix to identify a proxy communication and an E164 number for a terminal of the second subscriber. Alternatively, the request is related to an ongoing communication session identified by a session ID or by a session profile, e.g., "meeting of all department managers on Monday".

The transfer of a request from one terminal of the first terminal group to the proxy apparatus is achieved via a first sub-session or a separate signalling link. Preferably, the proxy apparatus controls the setup of the further sub-sessions to both terminal groups. Alternatively, the proxy apparatus controls the setup of sub-sessions to the terminal group of the second subscriber. This is possible if already a first sub-session has been established between the-terminal used by the first subscriber for the transfer of the request and the proxy apparatus.

The proxy apparatus shown in FIG. 1 evaluates data and speech as types of communication being available for the first group of terminals and multimedia as types of communication being available for the second terminal.

The proxy apparatus then sets up terminal sub-sessions between the groups of terminals according to types of communication being available therefore. In the shown scenario with different types of communication differ between the group of terminals this requires the merging data and speech into a multimedia data stream for submission to the second subscriber 14. Also, the reverse direction the multimedia data stream is split into a single speech and data information stream for submission to the related terminals. Here, speech is submitted to the mobile phone and data is submitted to the PDA.

FIG. 2 shows the provision of a proxy 10 according to the present invention between three subscribers to another typical communication session scenario of the present invention. Such a situation arises, e.g., if a conference type of communication session is set up right from the beginning or when a communication session is initialized with two subscribers while the third and/or further subscribers with a third and/or further group of terminal join later on.

An important aspect of the invention as shown in FIG. 1 and FIG. 2 is that the setup of a communication session between subscribers is not static but may vary over time. One reason for this may be that a subscriber who is already participating in the communication session enables a further terminal for participation in the communication session, e.g., by switching it on. Another reason is that a subscriber disables a terminal in this terminal group, e.g., by switching it off, or that the subscriber group of a communication session changes.

In either case the proxy apparatus will or may re-evaluate the types of communication for the group of terminals of this subscriber after reception of a related request. In accordance with the re-evaluation result the proxy apparatus may, e.g., change of parameters defining the terminal sub-session characteristics for at least one existing terminal sub-session. Alternatively, the proxy apparatus may control the release of at least one existing terminal sub-session and/or control the setup of at least one new terminal sub-session in order to optimise the communication session with respect to the available terminals.

For an extension of the subscribers to a communication session the proxy apparatus receives a request to join an ongoing communication session. Then the proxy apparatus determines the corresponding ongoing communication session and checks whether the new session-subscriber is admitted to the ongoing communication session or not. Here, admission to join is checked through interrogation of subscribers currently participating in the communication session or through evaluation of a stored user profile or a stored session profile. If the new subscriber is admitted to join the ongoing communication session the types of communication for the group of terminals of the new subscriber are evaluated. if the subscriber is not admitted, the request is rejected.

In accordance with the evaluation result the proxy apparatus 10 controls the setup of at least one new terminal subsession and further the information transmission between the terminal groups of the new subscriber and the existing subscribers. The proxy apparatus may also change parameters for existing terminal sub-sessions and achieve the merging and splitting of information, as already outlined above.

In the case the number of subscribers to a communication session is reduced—e.g., according to a transition from the application scenario shown in FIG. 2 to the application scenario shown in FIG. 1—the proxy apparatus receives a release message concerning a terminal sub-session for the subscriber leaving the communication session. Further, the proxy apparatus 10 may change parameters for the remaining terminal sub-session(s) of the communication session and/or control the release of the complete communication session if only a single subscriber remains.

In the following, a more detailed explanation of the proxy apparatus will be given with respect to FIGS. 3 to 5. The embodiment of the proxy apparatus 10 shown in FIG. 3 uses a minimal configuration and only controls the communication session as illustrated above through a controller 16. The controller 16 is linked to a user profile data base 18 storing communication types of terminal groups and corresponding terminal IDs for subscribers. Preferably, the proxy apparatus also stores a list of current communication session and/or terminal sub-sessions and the status thereof. In one embodiment this information is stored in the user profile data base 18. Further, the controller 16 is linked to a gatekeeper 20 achieving address translation between the first terminal group and the second terminal group, to a voice gateway 22 for transfer of speech to terminals, and to a network access server 24 for transfer of data to terminals.

Figure 4:
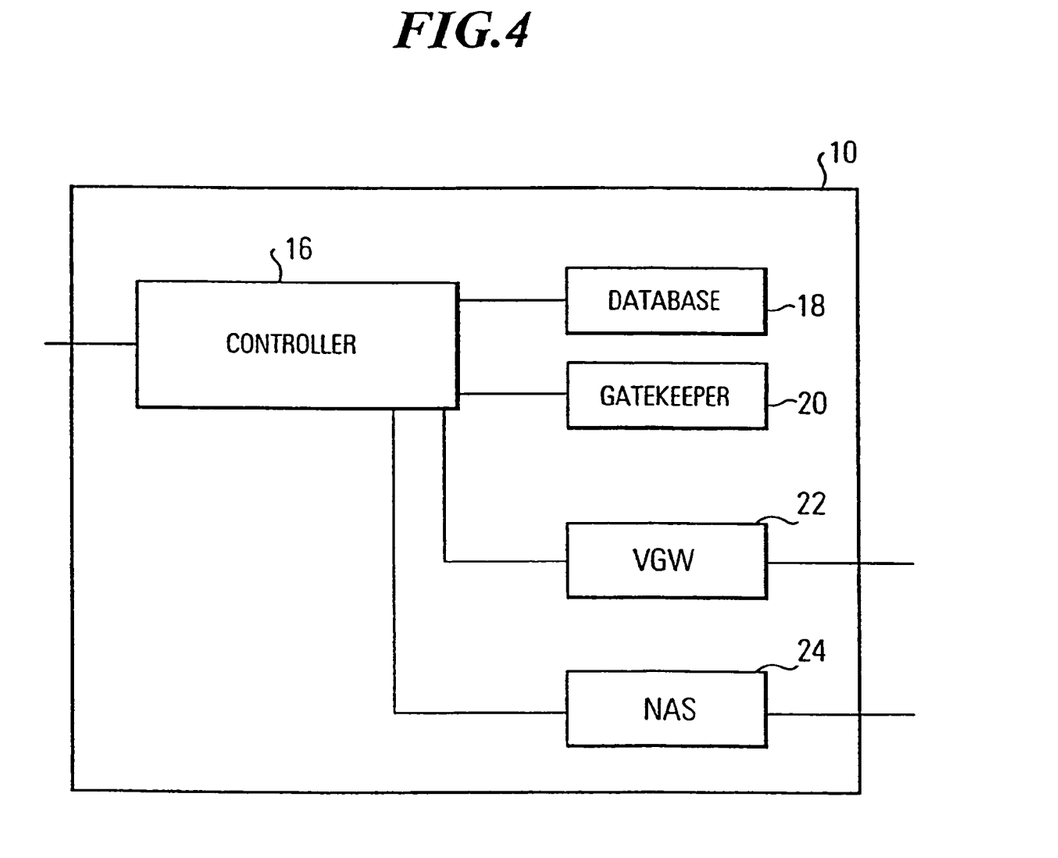
FIG. 4 shows a schematic diagram of the integrated type proxy apparatus according to the present invention.

According to another embodiment of the proxy apparatus shown in FIG. 4, the user profile data base 18, the gatekeeper 20, the voice gateway 22 and/or the network access server 24 are integrated into the proxy apparatus 10.

It should be noted that the content of the user profile database 18 may be configured in a flexible way on demand. For mobile subscribers the entry could be related to the name of the subscriber and the related number. If a subscriber uses a plurality of terminals, preferably all addresses or telephone numbers are stored in relation to the different call types.

According to another embodiment of the present invention the proxy controller 16 requests from a subscriber via a terminal the desired communication capabilities through signalling. These communication capabilities may either be all communication capabilities available to the subscriber or only a sub-set thereof. Alternatively, the subscriber may receive a menu of all available communication capabilities for selection. Further, the proxy controller 16 may also check for readiness of subscriber terminals to receive services.

According to another embodiment of the present invention the controller 16 negotiates communication capabilities— e.g., bandwidth or quality of service QoS for a terminal sub-session—with the terminal using dedicated protocols.

Figure 3:
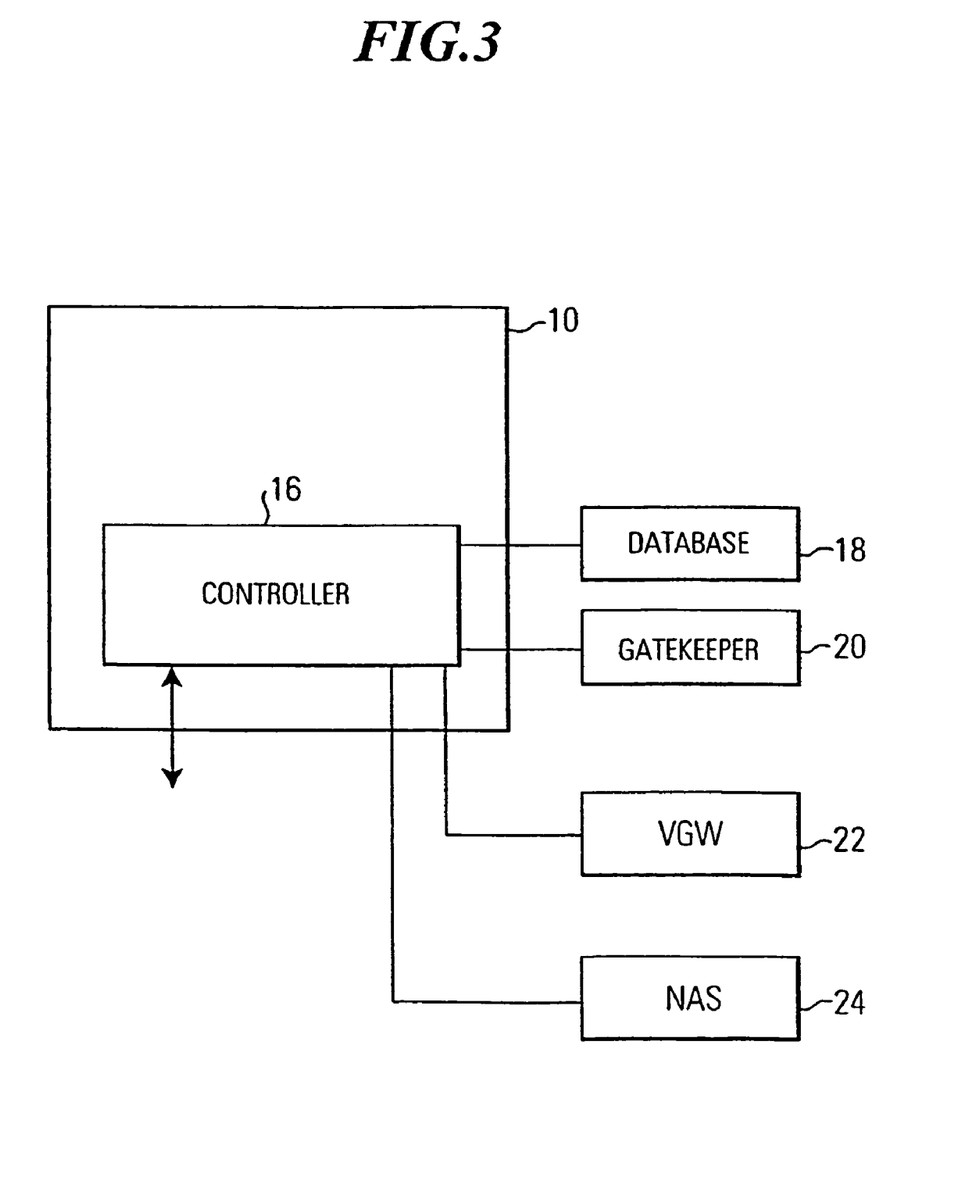
FIG. 3 shows a schematic diagram of the distributed type proxy apparatus according to the present invention.

As will be noted by those skilled in the art, it depends on the actual implementation whether either the embodiment according to FIG. 3 or the embodiment according to FIG. 4 or any suitable combination thereof will be used for communication-session setup and control.

Figure 5:
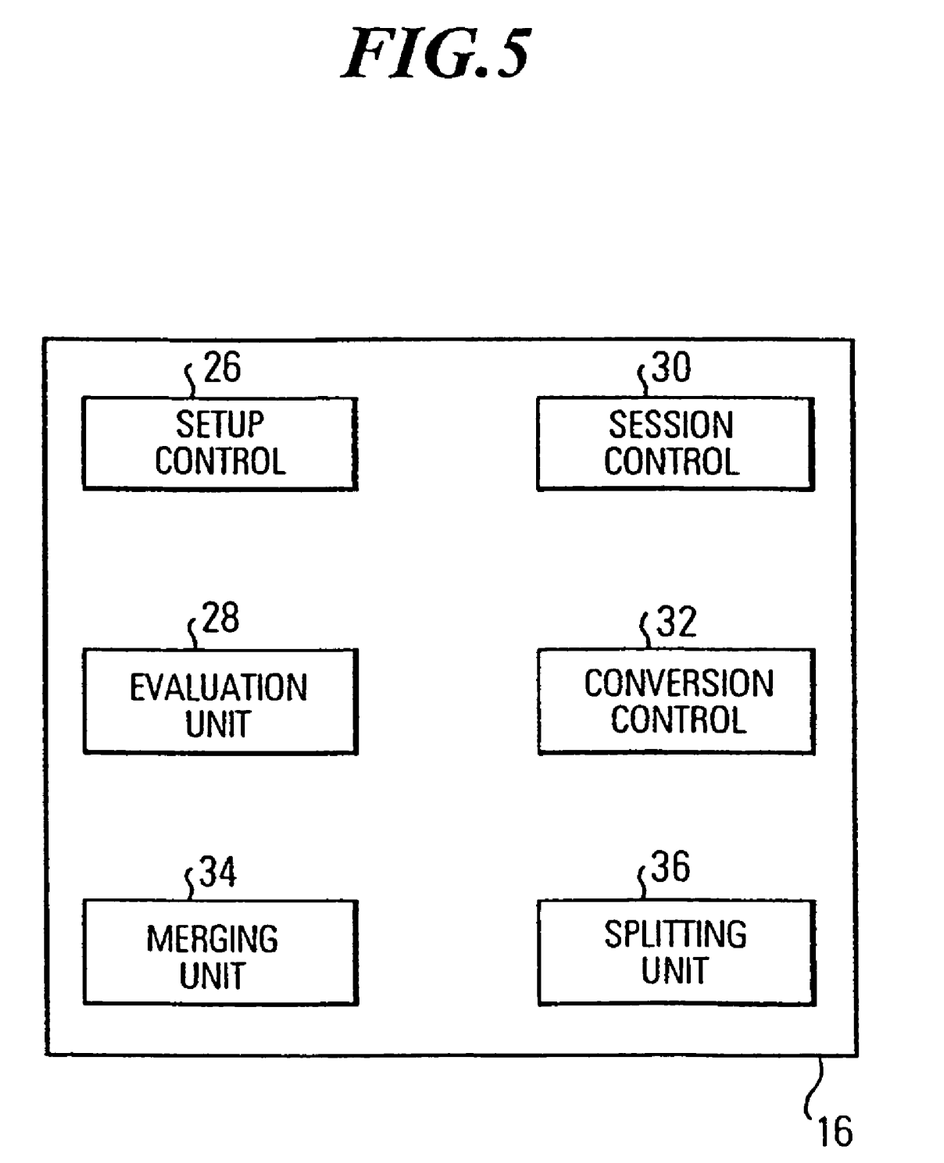
FIG. 5 shows a schematic diagram of the proxy apparatus controller according to the present invention as shown in FIGS. 3 and 4, respectively.

Further details of the controller 16 of the proxy apparatus are shown in FIG. 5. The controller comprises a setup control unit 26, an evaluation 28, a session control unit 30, a conversion control unit 32, a merging unit 34 and a splitting unit 36. All units may be realized in a single hardware and/or software module. Alternatively, each unit may be realized as a stand-alone hardware and/or software module. Finally, also any variation between the possibilities is covered by the present invention.

Operatively, the setup control unit 26 receives the request for a communication session and supplies it to the evaluation unit 28. The request for the communication session identifies the desired type of communication, e.g., data, voice, video, etc. for the communication session. Alternatively, if no specific communication capabilities are submitted to the controller 16 it may then have access to the user profile database 18 to read from subscriber files communication types used by the subscribers and related terminals IDs.

Further, the evaluation unit 28 shown in FIG. 5 evaluates the types of communication being available for the involved group of terminals on the basis of the request. The request forms the basis for the evaluation in that it comprises preferred types of communication which are then analysed for availability. Finally, the setup control unit 30 controls the setup of terminal sub-sessions from the proxy apparatus 10 to the terminals according to the evaluated types of communication being available. Here, availability means that a terminal handling the corresponding type(s) of communication is switched on and is reachable and that further resources to setup a sub-session to the terminal exist.

In more detail, the evaluation unit 28 may communicate with one terminal of a subscriber for input of communication capabilities. Also, the evaluation unit 28 is adapted to interrogate terminals to determine related communication capabilities and/or readiness for service or to negotiate communication capabilities via a dedicated protocol.

The conversion control unit 32 of the controller 16 controls conversion of payload and/or control information for transmission between the different groups of terminals according to the type of communication of the terminals.

As shown in FIG. 5, according to a preferred embodiment the proxy apparatus 10 comprises the merging unit 34 adapted to control the merging of payload information and/or control information of at least two terminal sub-sessions for common transmission via a further terminal sub-session. Also preferably, the controller 16 comprises the splitting unit 36 adapted to control the splitting payload information and/or control information of a terminal sub-session for transmission over separate terminal sub-sessions.

Finally, the session control unit 30 controls and monitors the operation of the sub-units of the proxy apparatus during a communication session.

The different-units shown in FIGS. 3 to 5 may alternatively be implemented either by software or hardware and either by integrating into existing networking equipment or a standalone dedicated proxy apparatus. What solution is finally chosen depends on the actual application and the preferences of the network operator or service provider offering the proxy functionality.

Figure 6:
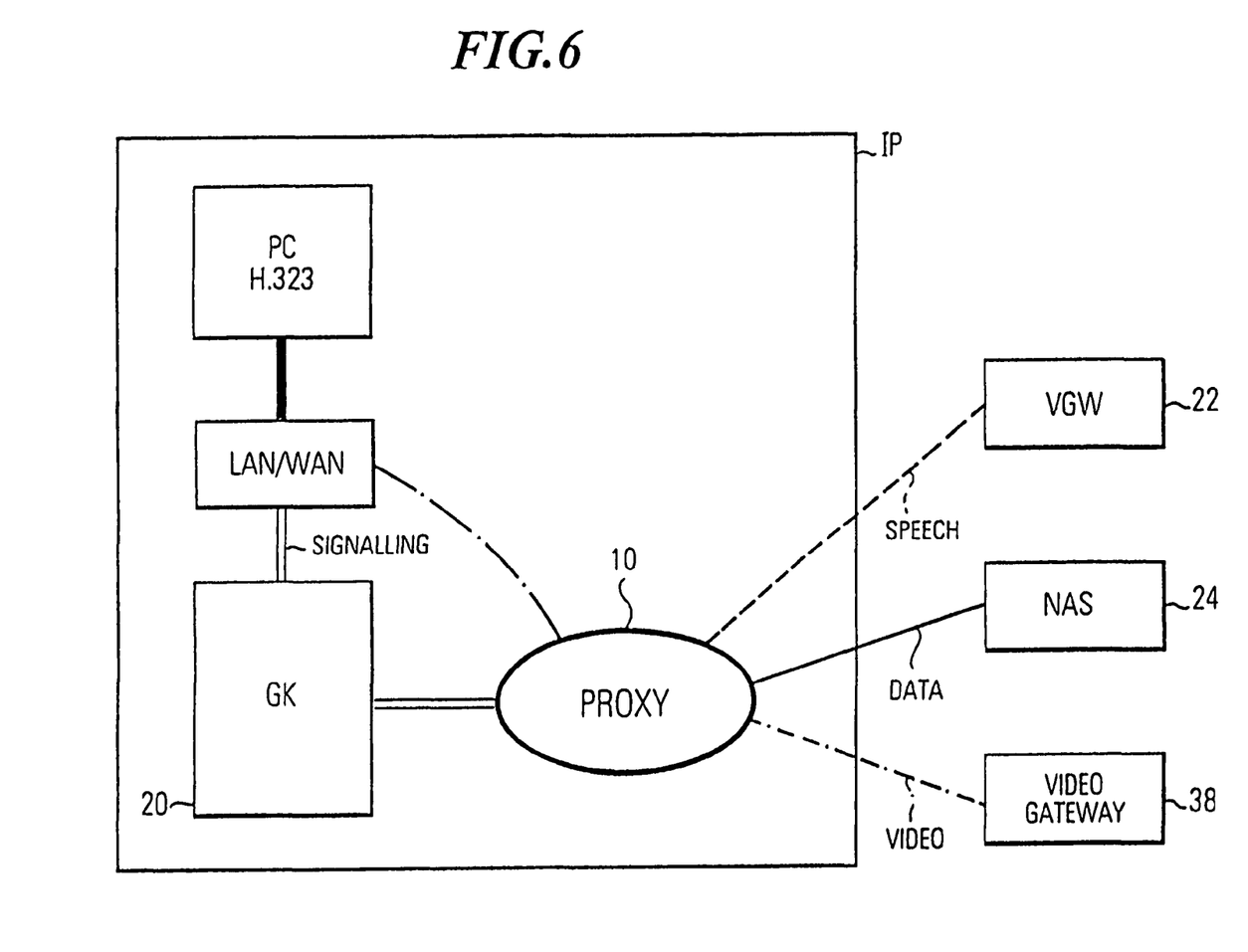
FIG. 6 shows the use of the proxy apparatus according to the present invention in an inbound mode.
Figure 7:
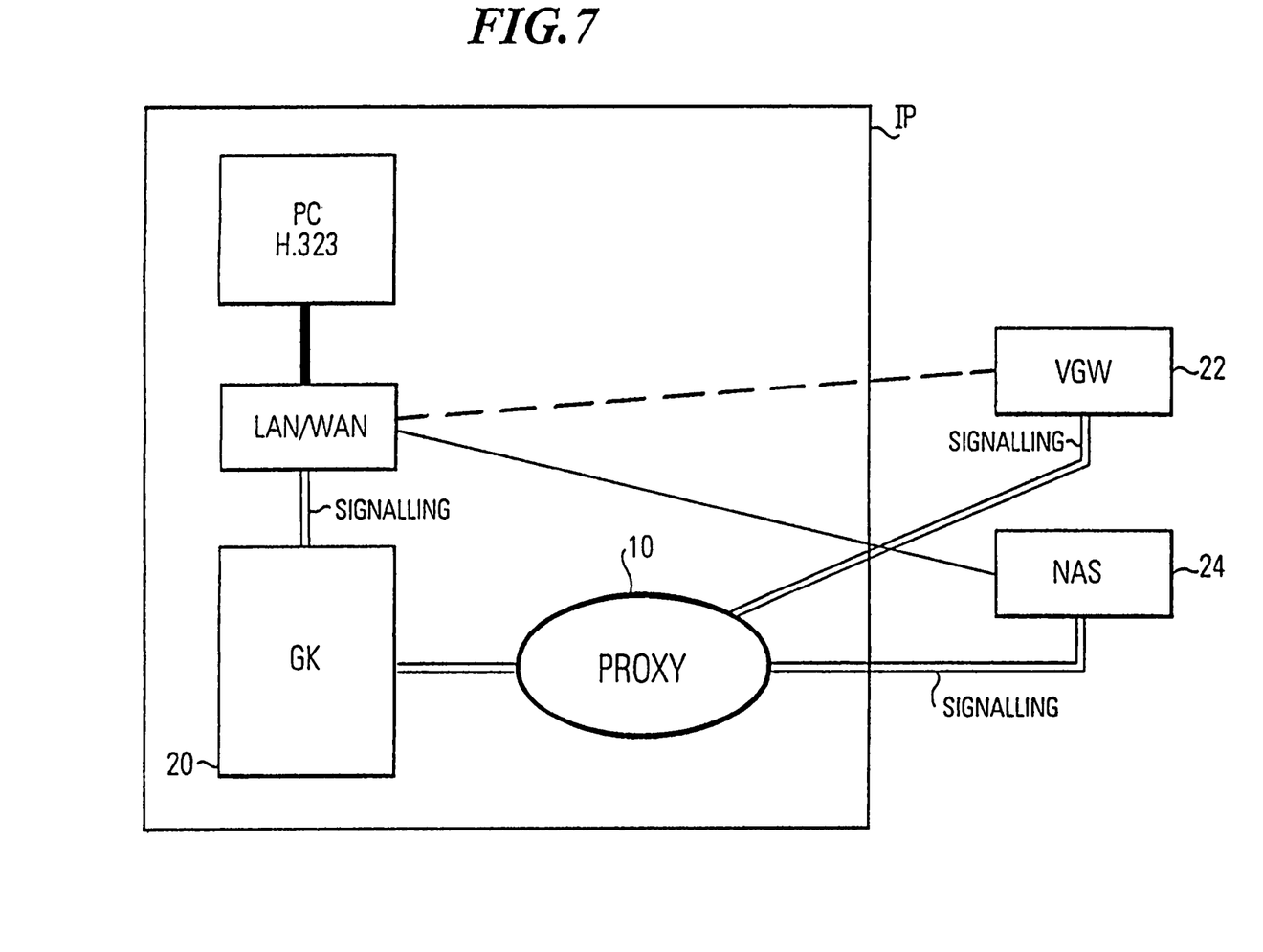
FIG. 7 shows the use of the proxy apparatus according to the present invention in an outbound mode.

FIG. 6 and FIG. 7 show application scenarios for the proxy apparatus 10 explained above. These application scenarios apply to a first subscriber using a multimedia PC in an IP-based LAN/WAN environment generating a, e.g., H.323 multimedia data stream. The first subscriber addresses a second subscriber which uses, e.g., a terminal having GPRS functionality supporting data, which is connected to the network via a network access server 22. Also, the second subscriber uses a mobile telephone having GSM functionality which is connected to the network via the voice gateway 24, and a video terminal having GPRS functionality connected to the network via a video gateway 38.

Further, the first subscriber using the multimedia PC may be linked to the gatekeeper 20 via a signalling line, e.g., for address translation between IP addresses and telephone numbers of the terminals of the second subscriber. As shown in FIG. 6, the payload is transferred through the proxy apparatus 10 and so that this scenario is referred to as inbound application scenario.

To the contrary, FIG. 7 shows an outbound scenario for the proxy apparatus 10. Assuming the same application situation, the difference is that the multimedia PC is not transferring payload information to the proxy apparatus 10 itself but directly to, e.g., the network access server 22 and the voice gateway 24. Therefore, in the outbound application scenario the proxy apparatus 10 only handles signalling information for the control of the communication set-up and the exchange of payload information during the ongoing communication session.

In either application scenario shown in FIGS. 6 and 7 the Internet Protocol may be used as transmission mechanism. Preferably, also the connections between the proxy apparatus, the voice gateway 22 and the network access server 24 are based on IP.

Figure 8:
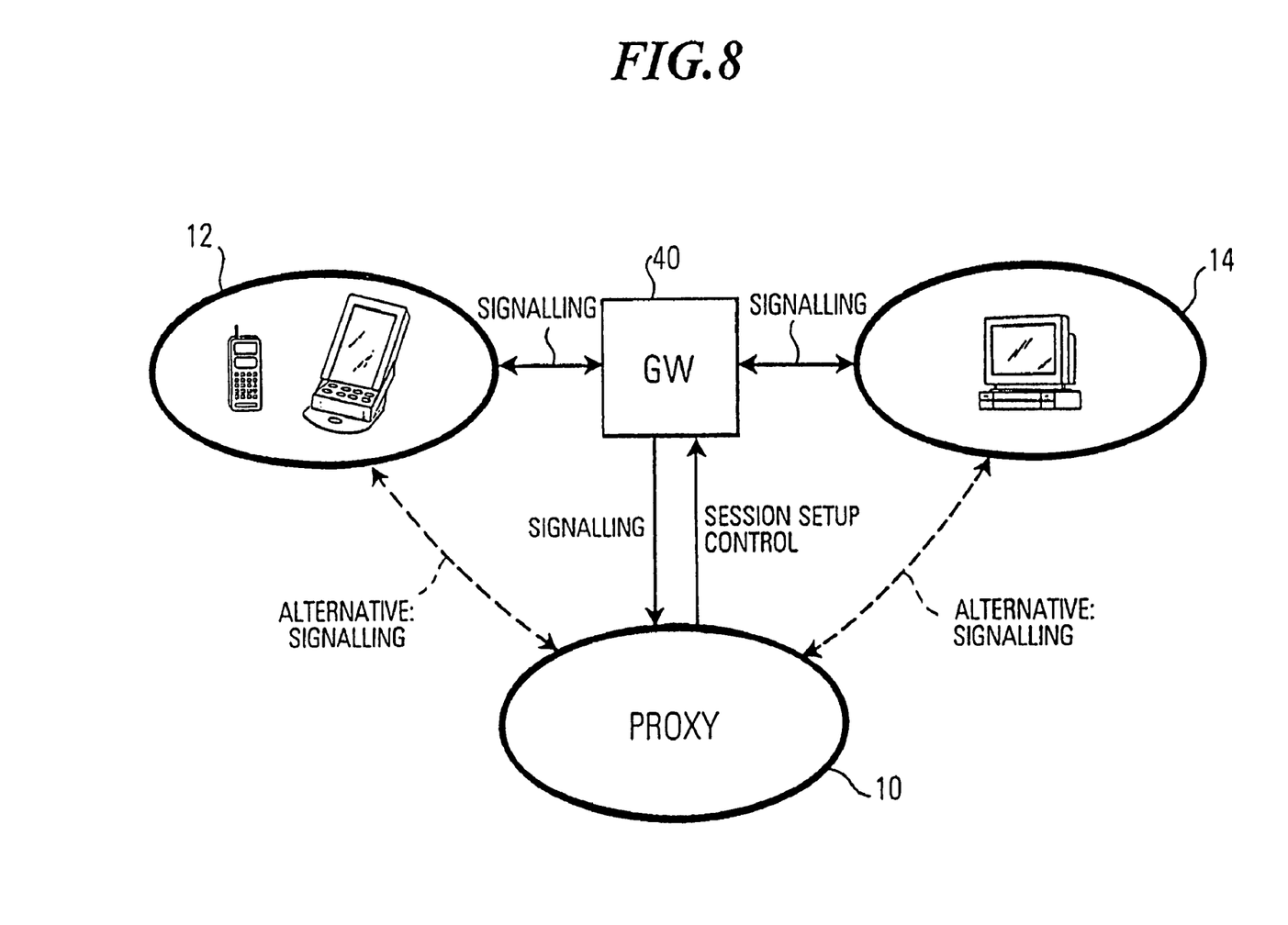
FIG. 8 shows details of a communication session setup according to the present invention.

FIG. 8 shows further details for the outbound application scenario illustrated in FIG. 6. As shown in the upper part of FIG. 8, initially a request for a communication session set-up is transferred to the proxy apparatus 10. Alternatively, the request can be sent via the gatekeeper. The proxy apparatus 10 processes the request and outputs control instructions to a payload/control information mapping unit 40 or equivalently to a gateway 40. Once a control of the set-up is settled the actual transfer of payload information between the first and second subscriber is achieved-without inbound activation of the proxy apparatus 10. Thus, the proxy apparatus 10 is only activated in case further control is necessary. Further, FIG. 8 also shows that the request for a communication session may alternatively be submitted directly to the proxy apparatus 10 bypassing the gateway 40.

Figure 9:
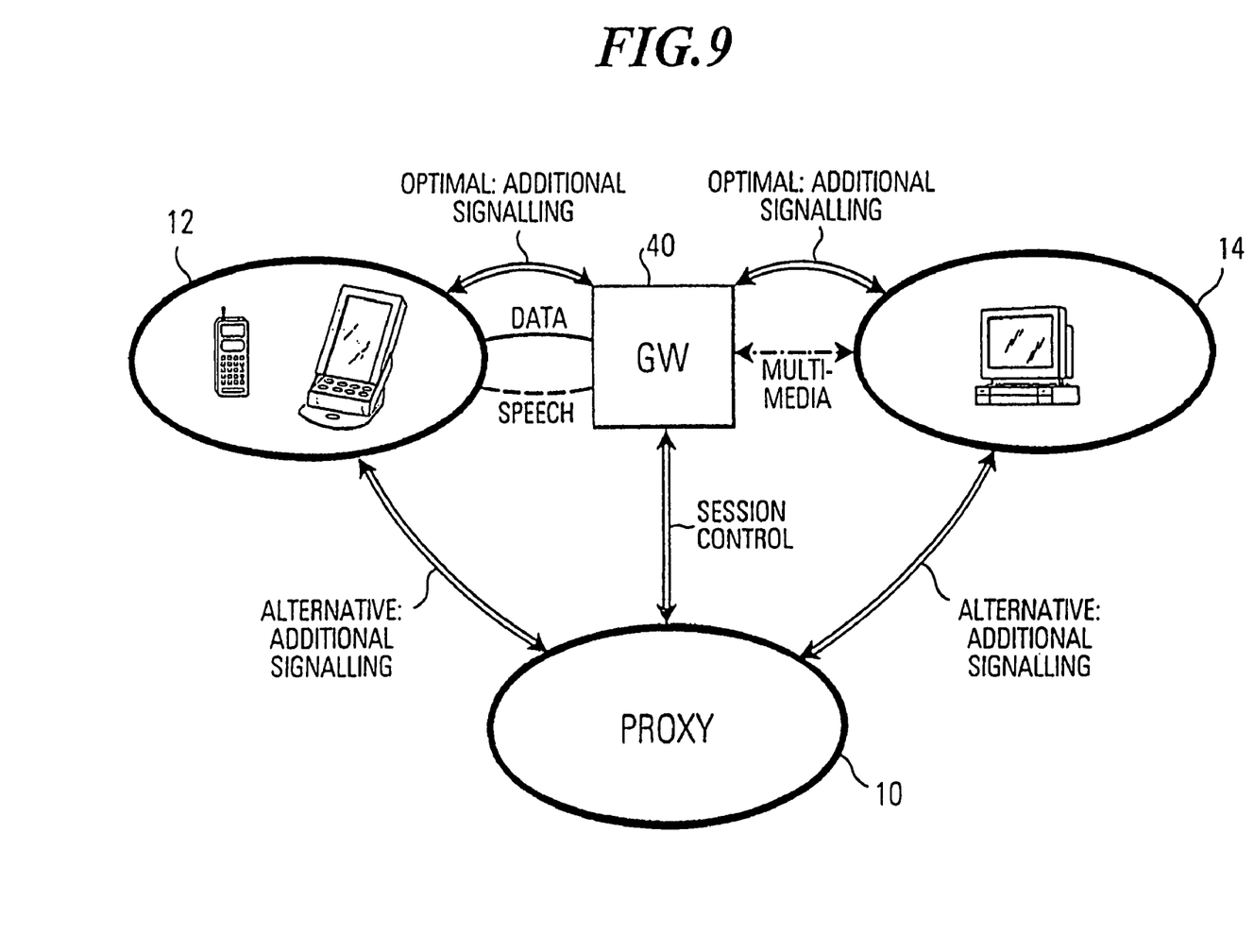
FIG. 9 shows further details of an ongoing communication session according to the present invention in the outbound mode.

As shown in FIG. 9, once a setup of a communication session in the outbound mode is achieved exchange of information is executed via the gateway 40. Nevertheless, the proxy apparatus 10 continues to control the communication session. Optionally, also an exchange of additional signaling information may be achieved between the involved subscriber terminals, the proxy apparatus 10, and the gateway 40, e.g., for an additional menu control of the communication session.

It should be noted that while above inbound and outbound application scenarios of the proxy apparatus 10 have been illustrated, according to the present invention also a combination of such approaches is applicable, e.g., such that for certain specific types of payload the inbound solution is chosen and for the remaining types of payload the outbound solution is chosen. The actual choice may then depend on available and pre-installed network infrastructure. E.g., in the case network access servers or appropriate gateways are already available in the network additional costs to re-implement the related functionalities again in the proxy apparatus 10 can be avoided. Here, it is much better to use resources and provide a proxy apparatus 10 only carrying out the control of the communication session set-up.

Figure 10:
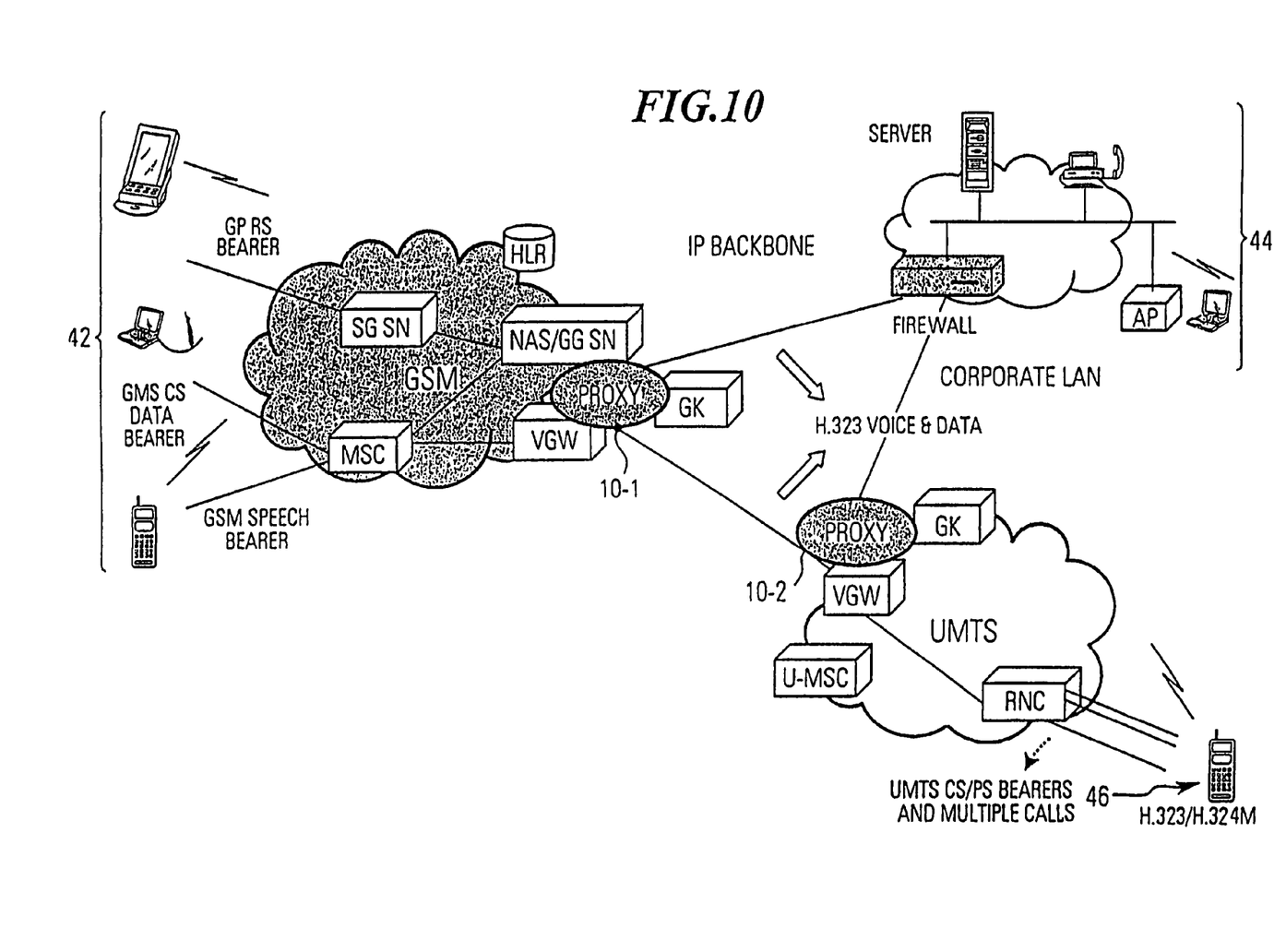
FIG. 10 shows different application scenarios for the proxy apparatus and method according to the present invention.

FIG. 10 shows a multiple communication network related application scenario for the inventive proxy apparatus and method. For the application scenario shown in FIG. 10 there exist three network domains, i.e. the GSM cellular mobile communication network, the UMTS cellular mobile communication network and a corporate LAN network. Here, a first subscriber is linked to the GSM cellular communication network and uses a first group of terminals 42. This group of terminals 42 comprises a standard GSM mobile telephone using a circuit switched speech bearer, a laptop linked via a PCMCIA card using a circuit switched data bearer to the GSM cellular communication network, and a data terminal connected via GPRS.

As shown in FIG. 10, a second subscriber uses a second group of terminals 44, a laptop linked, e.g., via WLAN or Bluetooth to the corporate LAN and a telephone using a phone shell running on a workstation being connected to the corporated LAN.

As also shown in FIG. 10, a third subscriber is linked to the UMTS cellular communication network and uses a mobile telephone with multimedia capabilities 46, e.g., using H.323, H.324M or SIP.

As shown in FIG. 10, the three network domains GSM, UMTS, LAN are linked to each other using two proxy apparatuses 10-1, 10-2. Here, the use of several proxy apparatuses 10-1, 10-2 allows to summarize different calls for transmission over only a single communication channel using the same transmission protocol, which is preferably IP.

Further, the proxy apparatuses 10-1, 10-2 shown in FIG. 10 may also achieve synchronization between different payload data streams, e.g., video and voice considering the fact that video needs longer transfer times so that voice is preferably delayed. Another option would be to use an externally supplied timing reference signal for synchronization of a plurality of terminals participating in a communication session.

From the application scenario shown in FIG. 10 it is evident that a communication session should be considered as a time variant dynamic process.

Furthermore, it is possible that different subscribers change the terminals used during the communication session. As outlined above, this may trigger the re-evaluation of parameters classifying the related terminal sub-sessions. Another case is that two subscribers start a communication session and then a third subscriber using his own terminal group joins the communication session or that a subscriber enables a further terminal for the communication session.

In the case of a new joining subscriber there is submitted a request to join the communication session at the appropriate proxy apparatuses 10-1, 10-2. The proxy apparatus 10-1, 10-2 determines whether the subscriber is admitted to join the communication session or not. In the case of admission the proxy apparatus evaluates the types of communication for the new subscriber and carries out at least one of the following steps in compliance with the evaluation result: Control of the set-up for the terminal group of the new subscriber and the related terminal sub-sessions, control of information transmission between the new terminal group and existing terminal groups, a new optimisation of communication parameters considering the now existing modified types of communication for all terminal groups and/or merging/splitting of information for transmission via a common terminal sub-session or separate terminal sub-sessions.

To the contrary, for the application shown in FIG. 10 one of a plurality of subscribers may drop out some or all of his terminals involved in an ongoing communication session. In this case a request to release related terminal sub-sessions to the subscriber or a corresponding release message is received at the proxy controller 16. In case only two subscribers attend the communication session this would lead to the release of the communication session itself.

When a subscriber joins or removes terminals from a communication session it is a very effective approach to re-evaluate the parameters determining characteristics of the communication session, e.g., bandwidth, communication capabilities, etc. This may lead to a change of parameters and eventually to the release of existing terminal subsessions which may be substituted through newly installed terminal sub-sessions according to communication capabilities which could not be used so far due to restricted communication capabilities of the removed terminal(s).

As shown in FIG. 10, the proxy apparatus and method according to the present invention may be applied in different mobile communication networks, e.g., GSM 900/1800, PCS1900, WCDMA, CDMA2000, EDGE type of radio networks. The terminals are specified in view of these standards and no modifications of these terminals are needed in view of the proxy apparatus and method.

Applications like document editing, electronic whiteboarding, voice enriched presentations, video conferences are only some examples of applications relying on the proxy apparatus and method according to the present invention.

Other applications would be Voice over IP (VOIP) applications or multimedia applications using, e.g., the H.323 standard. In the latter case, the proxy apparatus and method takes responsibility to combine, e.g., the calls from the first terminal group 28 into one H.323 call towards the corporate LAN and to split the H.323 call into different calls in the reverse direction.

Therefore, the proxy apparatus 10-1 at the edge of the GSM/GPRS mobile communication network performs a linkage between multimedia streams with voice and data into three separate connections towards the first group of terminals 26. Here, speech and video (usually both real-time traffic) and data (usually best effort traffic) are using different bearer layers for their transmission towards the first group of terminals 26. Each bearer layer in the GSM cellular mobile communication network is used at its best without compromising the subscriber's perception of the specific application.

Appropriate synchronization is provided between the three separate connections and the multimedia call adding appropriate delays under control of the proxy apparatus 10-1 to compensate the different characteristics of the three different GSM speech, GSM data and GPRS bearer layers.

Further, for the subscribers in the corporate LAN the mobile subscriber is identified through only a single personal identity corresponding to a virtual multimedia, e.g., H.323 client functionality in the proxy apparatus 10-1. In other words, the particularities of the mobile access are completely hidden through the proxy apparatus 10-1 enabling seamless communication and integration for users of standard developed applications.

What is claimed is:

1. A method, in a telecommunication network, of providing simultaneous voice, video and data applications between at least two subscribers, said method comprising the steps of:
    receiving, at a proxy apparatus, a request for a communication session, the request originating from a first subscriber and identifying at least a second subscriber to the communication session, the first subscriber using a first group of terminals and the second subscriber using a second group of terminals wherein the first group of terminals have a first set of operating characteristics and systems and the second group of terminals have a second set of operating characteristics and systems,
    the first group of terminals comprising three terminals including a GSM mobile telephone using a circuit switched speech bearer, a laptop computer linked via a PCMCIA card using a circuit switched data bearer to a GSM cellular communication network and a data terminal connected via GPRS and
    the second group of terminals comprising a laptop linked to a corporate LAN and a telephone using a phone shell running on a workstation being connected to the corporate LAN;
    evaluating types of communication available for the first group of terminals and the second group of terminals;
    setting up terminal sub-sessions from the proxy apparatus to the first group of terminals and to the second group of terminals according to types of communication available, wherein the plurality of different terminals in the at least one of the first group of terminals and the second group of terminals are each associated with a sub-session of the communication session, each sub-session being associated with the communication session;
    the proxy apparatus mapping incoming media streams from the first group of terminals onto outgoing media streams to the second group of terminals and
    synchronizing different payload data streams, the data streams including video and voice.

2. The method according to claim 1, wherein the request for the communication session identifies the desired types of communication for the communication session.

3. The method according to claim 1, wherein the evaluating step further comprises the step of reading from subscriber profiles communication types of terminal groups used by the subscribers and corresponding terminal IDs.

4. The method according to claim 1, wherein the evaluating step further comprises the step of contacting at least one terminal of a subscriber for input of communication capabilities.

5. The method according to claim 1, wherein the evaluating step further comprises the step of interrogating the group of terminals of at least one subscriber to determine related communication capabilities and readiness for service.

6. The method according to claim 1, wherein the evaluation step further comprises a the step of negotiating communication capabilities via a dedicated protocol.

7. The method according to claim 1, further comprising the step of controlling a transmission of payload or control information between the proxy apparatus, the first group of terminals of the first subscriber, and at least the second group of terminals of the second subscriber, according to the types of communication available for the terminals.

8. The method according to claim 1, further comprising the step of controlling the merging of payload information or control information of at least two terminal sub-sessions for common transmission via a further terminal sub-session.

9. The method according to claim 1, further comprising the step of controlling a splitting of payload information or control information of a terminal sub-session for transmission over separate terminal sub-sessions.

10. The method according to claim 1, further comprising the step of controlling a conversion of payload information or control information.

11. The method according to claim 1, further comprising the steps of:
    re-evaluating the types of communication for the group of terminals of a subscriber after reception of a further request at the proxy apparatus; and
    responsive to the re-evaluation result, changing parameters for at least one existing terminal sub-session, controlling the release of at least one existing terminal sub-session, or controlling the setup of at least one new terminal sub-session.

12. The method according to claim 1, further comprising the steps of:
    receiving, at the proxy apparatus, a request to join an ongoing communication session from a new communication session subscriber;
    determining the ongoing communication session corresponding to the request;
    evaluating whether the new communication session subscriber is admitted to the ongoing communication session; and
    responsive to the evaluation, rejecting the request to join if the new communication session subscriber is not admitted to the ongoing communication session or, if the new communication session subscriber is admitted to join the ongoing communication session, evaluating the types of communication available for a group of terminals used by the new subscriber and setting up at least one terminal sub-session according to the types of communication available.

13. The method according to claim 1, wherein the release of at least one terminal sub-session is achieved by detecting a release request for at least one terminal sub-session of a communication session, controlling the release of the at least one terminal sub-session or changing parameters for the remaining terminal sub-sessions of the communication session, or controlling the release of the communication session.

14. The method according to claim 1, further comprising the step of receiving a request for a communication session from a further proxy for inter-proxy communication.

15. A proxy apparatus, connected to a gateway in a telecommunication network and providing simultaneous voice, video and data streams, the proxy apparatus comprising:
    a setup control unit using a processor for receiving a transmitted request for a communication session, the request originating from a first subscriber and identifying at least a second subscriber, the first subscriber using a first group of terminals and the second subscriber using a second group of terminals, wherein the first group of terminals have a first set of operating characteristics and systems and the second group of terminals have a second set of operating characteristics and systems and each group comprising a plurality of different terminals, the first group of terminals comprising three terminals including a GSM mobile telephone using a circuit switched speech bearer, a laptop computer linked via a PCMCIA card using a circuit switched data bearer to a GSM cellular communication network and a data terminal connected via GPRS and the second group of terminals comprise a laptop linked to a corporate LAN and a telephone using a phone shell running on a workstation being connected to the corporate LAN;

an evaluation unit using the processor for evaluating types of communication transmissions being available for the first group of terminals and at least the second group of terminals;

a mapping unit for mapping incoming streams from the first group of terminals onto outgoing streams to the second group of terminals; and a session control unit using the processor for controlling terminal sub-sessions from the proxy apparatus to the first group of terminals and to the second group of terminals according to types of communication available, wherein the plurality of different terminals in the at least one of the first group of terminals and the second group of terminals are each associated with a sub-session of the communication session, each sub-session being associated with the communication session, the proxy apparatus achieving synchronization by coordinating the terminal sub-sessions between different payload data streams, including video and voice data streams.

16. The proxy apparatus according to claim 15, wherein the evaluation unit is adapted to read communication types of terminal groups and corresponding terminal IDs from a user profile data base.

17. The proxy apparatus according to claim 15, wherein the evaluation unit is adapted to contact at least one terminal of a subscriber for input of communication capabilities.

18. The proxy apparatus according to claim 15, wherein the evaluation unit is adapted to interrogate the group of terminals of at least one subscriber to determine related communication capabilities or readiness for service.

19. The proxy apparatus according to claim 15, wherein the evaluation unit is adapted to negotiate communication capabilities via a dedicated protocol.

20. The proxy apparatus according to claim 15, further comprising a conversion control unit adapted to control a conversion of payload or control information for transmission between the first group of terminals of the first subscriber and at least the second group of terminals of the second subscriber according to the type of communication for each terminal.

21. The proxy apparatus according to claim 15, further comprising a merging unit adapted to control the merging of payload information or control information of at least two terminal sub-sessions for common transmission via a further terminal sub-session.

22. The proxy apparatus according to claim 15, further comprising a splitting unit adapted to control splitting payload information or control information of a terminal sub-session for transmission over separate terminal sub-sessions.

23. The proxy apparatus according to claim 15, wherein the session control unit is further adapted to modify parameters of a terminal sub-session of a communication session subsequent to setting up the terminal sub-session.

24. The proxy apparatus according to claim 15, wherein the session control unit is further adapted to control a gatekeeper for address translation between different terminals.

25. The proxy apparatus according to claim 15, wherein the session control unit is further adapted to control a gateway or an access server for transfer of signaling or payload information to related terminals.

* * * * *